March 3, 1970 R. W. SLEITH ET AL 3,498,268
WEIGHTED PET FEEDING DISH
Filed May 17, 1968

INVENTORS
Robert W. Sleith
George E. Langevin
BY Chapin, Neal & Dempsey
Attorneys

United States Patent Office 3,498,268
Patented Mar. 3, 1970

3,498,268
WEIGHTED PET FEEDING DISH
Robert W. Sleith and George E. Langevin, Wilbraham, Mass., assignors to Suburban Plastics, Inc., North Wilbraham, Mass., a corporation of Massachusetts
Filed May 17, 1968, Ser. No. 730,156
Int. Cl. A01k 5/00
U.S. Cl. 119—61                                  4 Claims

ABSTRACT OF THE DISCLOSURE

A weighted pet feeding dish of molded synthetic plastic. The feeding dish comprises a bowl portion having a snap-in base plate and an elongated plastic bag filled with sand for weight purposes disposed along the underside of the bowl portion and retained therein by the base plate.

Background

The present invention is concerned with a plastic pet feeding dish that is weighted so as to prevent a pet, such as a dog, from overturning the dish or excessively moving the dish while eating or drinking from it.

As most pet owners will attest, most plastic pet feeding dishes presently available tend to be light and unstable and consequently subject to spillage by the pet during feeding.

In attempts to overcome this problem metal pet feeding dishes were produced. However, while dish stability was improved, the cost of such pet dishes is relatively high and many of them tend to scratch floors through slight movement caused by a dog or other pet.

It is the principal object of this invention to provide a weighted pet feeding dish.

It is another object of this invention to provide an inexpensive, durable pet feeding dish molded from a synthetic plastic.

The above and other objects and advantages of this invention will be more readily apparent from the following description with reference to the accompanying drawings in which.

Figure 1:
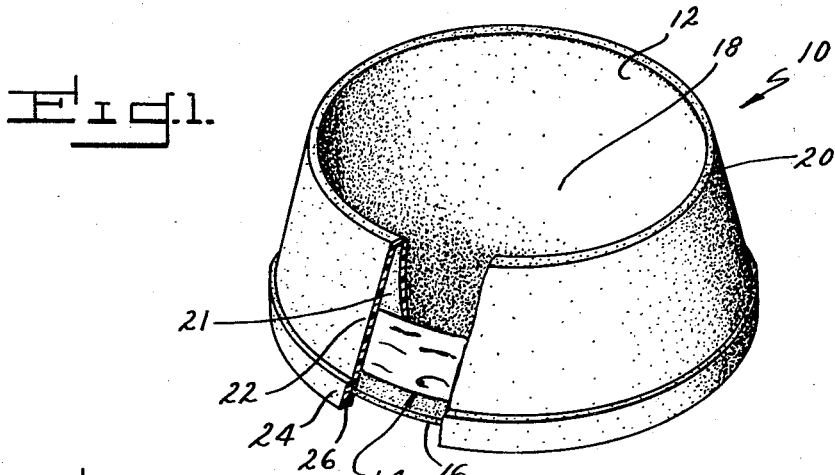
FIG. 1 is a top perspective view of the feeding dish of the present invention with a section broken away.
Figure 2:
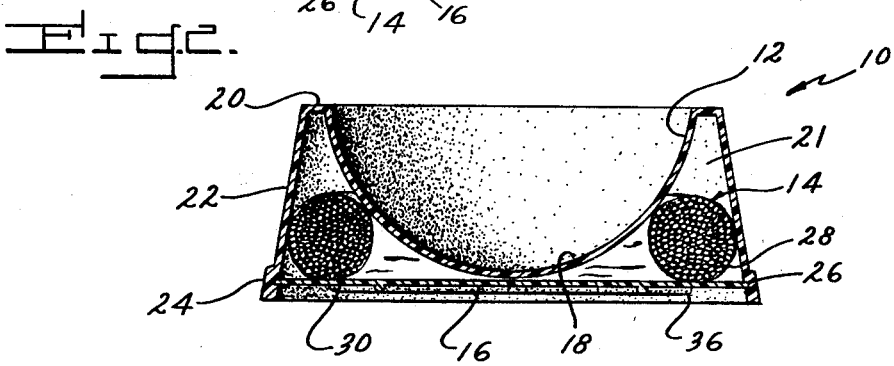
FIG. 2 is a sectional view of the pet dish generally taken along the line 2—2 of FIG. 1.

Referring to FIGS. 1 and 2, it will be seen that the dish 10 is comprised of three basic parts, a bowl portion 12, a weighting means 14 and retaining means in the form of a base plate 16 for holding said weighting means 14 within the dish 10.

The bowl portion 12 comprises a concave hemisphere 18 which communicates at its uppermost point with a lip or edge 20. The lip 20 extends into side wall 22 which diverges downwardly from the wall forming concave hemisphere 18 in a substantially uniform manner, to form an annulus or inner ring portion 21.

As best seen in FIG. 2, the side wall 22 terminates in a footing 24 which is somewhat thicker than the other walls of the dish 10. This imparts a greater degree of stability to the dish and also provides more material for the groove or recess 26, which will be discussed below.

In FIG. 2 it will be noted that the bottom of the concave hemisphere 18 lies above the bottom of footing 24 of the side wall 22 and the groove or recess 26 in the footing is spaced intermediate the bottom of the footing 24 and the bottom of the concave hemisphere 18.

Figure 3:
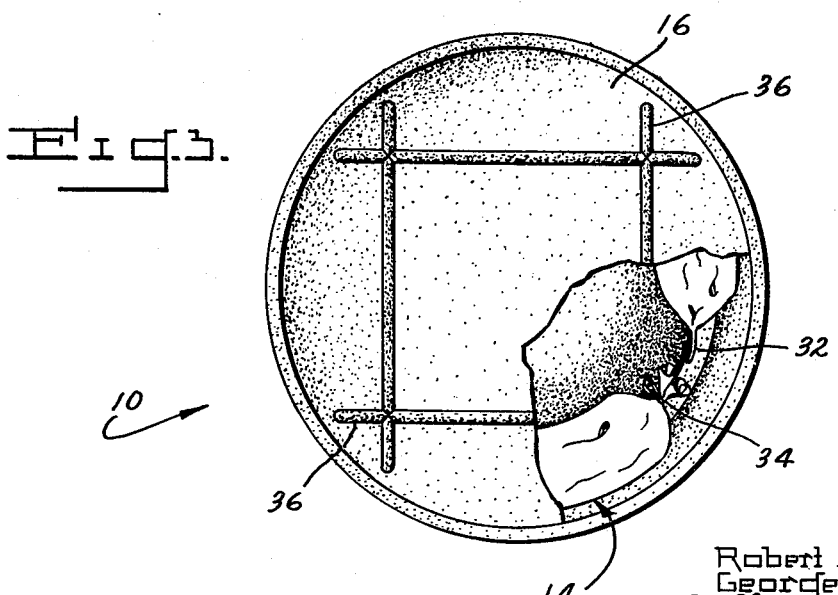
FIG. 3 is a bottom view of the bowl of FIG. 1, with a section broken away.

The weighting means 14 is disposed in the annulus 21 formed by the side wall 22 and the wall of the concave hemisphere 18. As shown, the weighting means is comprised of an elongated flexible plastic container or bag 28 filled with sand 30 or similar material. As seen in FIG. 3, the plastic bag may be heat sealed at one or both ends as is indicated at 32, or the ends may be tied with twine or other suitable means, such as shown at 34. The weighting means 14 is held in position in the annulus 21 by retaining means in the form of a base plate 16 which may be removably snapped into the groove or recess 26 in the footing of the side wall 22.

In FIGS. 1 and 3, it will be noted that the base plate is provided with ribs 36 for strength and stability purposes.

While the feeding dish of the present invention may be produced by a number of methods and of a variety of materials, it is preferably produced by plastic injection molding techniques. Of the many plastic materials that may be used to form the feeding dish, it has been found that thermoplastic plastics, such as polypropylene and the like are preferable.

While this invention has been described in particularity with reference to the preferred form thereof, it will be readily understood by those skilled in the art that further modifications and changes may be made therein without departing from the spirit and scope of the invention.

What is claimed is:
1. A weighted pet feeding dish comprising a bowl portion, a side wall extending from the top peripheral edge of said bowl portion angularly downwardly beyond the bottom of said bowl portion, weighting means comprising an elongated flexible container filled with sand disposed in the annulus formed by the bowl portion and the side wall, and means for retaining said weighting means in said annulus.

2. The weighted pet feeding dish of claim 1 wherein said retaining means comprises a recess disposed on the inside of said side wall near the bottom thereof and a base plate having portions that are removably engageable in said recess.

3. The weighted pet feeding dish of claim 1 wherein said dish is molded from a thermoplastic material.

4. The weighted pet feeding dish of claim 3 wherein said thermoplastic plastic material is polypropylene.

References Cited

UNITED STATES PATENTS

| | | | |
|---|---|---|---|
| 1,300,867 | 4/1919 | Pick | 220—70 |
| 1,413,750 | 4/1922 | McCollough | 119—61 |
| 2,178,812 | 11/1939 | Schade. | |
| 2,219,974 | 10/1940 | Bellow | 220—69 |
| 2,711,766 | 6/1955 | Archer et al. | 220—9 X |

FOREIGN PATENTS 36,090   3/1967   Finland.

DONALD F. NORTON, Primary Examiner

JAMES R. GARRETT, Assistant Examiner

U.S. Cl. X.R.

131—241; 220—9, 70